(12) United States Patent
Li et al.

(10) Patent No.: US 8,616,705 B2
(45) Date of Patent: Dec. 31, 2013

(54) LIGHT SOURCE DEVICE AND PROJECTION DISPLAY METHOD

(71) Applicant: Appotronics (China) Corporation, Shenzhen (CN)

(72) Inventors: Yi Li, Pleasanton, CA (US); Yi Yang, Shenzhen (CN)

(73) Assignee: Appotronics (China) Corporation, Shenzhen (CN)

( * ) Notice: Subject to any disclaimer, the term of this patent is extended or adjusted under 35 U.S.C. 154(b) by 0 days.

(21) Appl. No.: 13/668,156

(22) Filed: Nov. 2, 2012

(65) Prior Publication Data

US 2013/0114049 A1 May 9, 2013

Related U.S. Application Data

(60) Provisional application No. 61/555,967, filed on Nov. 4, 2011.

(51) Int. Cl.
*G03B 21/14* (2006.01)
(52) U.S. Cl.
USPC .......... 353/31; 353/84; 353/85; 353/94; 348/743; 362/231

(58) Field of Classification Search
USPC ............ 353/31, 34, 37, 84, 85, 94; 349/5–9; 362/231; 348/742, 743, 771
See application file for complete search history.

(56) References Cited

U.S. PATENT DOCUMENTS

| 6,252,636 B1 * | 6/2001 | Bartlett .................. 348/743 |
| 7,530,697 B2 * | 5/2009 | Sawai et al. ............. 353/94 |
| 2009/0009730 A1 * | 1/2009 | Destain .................. 353/84 |
| 2010/0283977 A1 * | 11/2010 | Wang et al. ............. 353/84 |

* cited by examiner

*Primary Examiner* — William C Dowling
(74) *Attorney, Agent, or Firm* — Chen Yoshimura LLP

(57) ABSTRACT

The present invention discloses a method and apparatus for a projection system using a solid-state light source and a color wheel. A set of primary light sources (such as RGB light source) with a light source controller is utilized to replace the UHP lamp. The color wheel has multiple color filter segments that are sequentially disposed on the path of the light when the wheel rotates. Based on a sync signal received from the rotating color wheel, the light source controller sequentially turns the primary light sources on and off in accordance with the sequence of the color filter segments of the color wheel. During each of the spoke periods, to generate a varying mixture of the two color lights, at least two primary color light sources are turned on simultaneously.

20 Claims, 15 Drawing Sheets

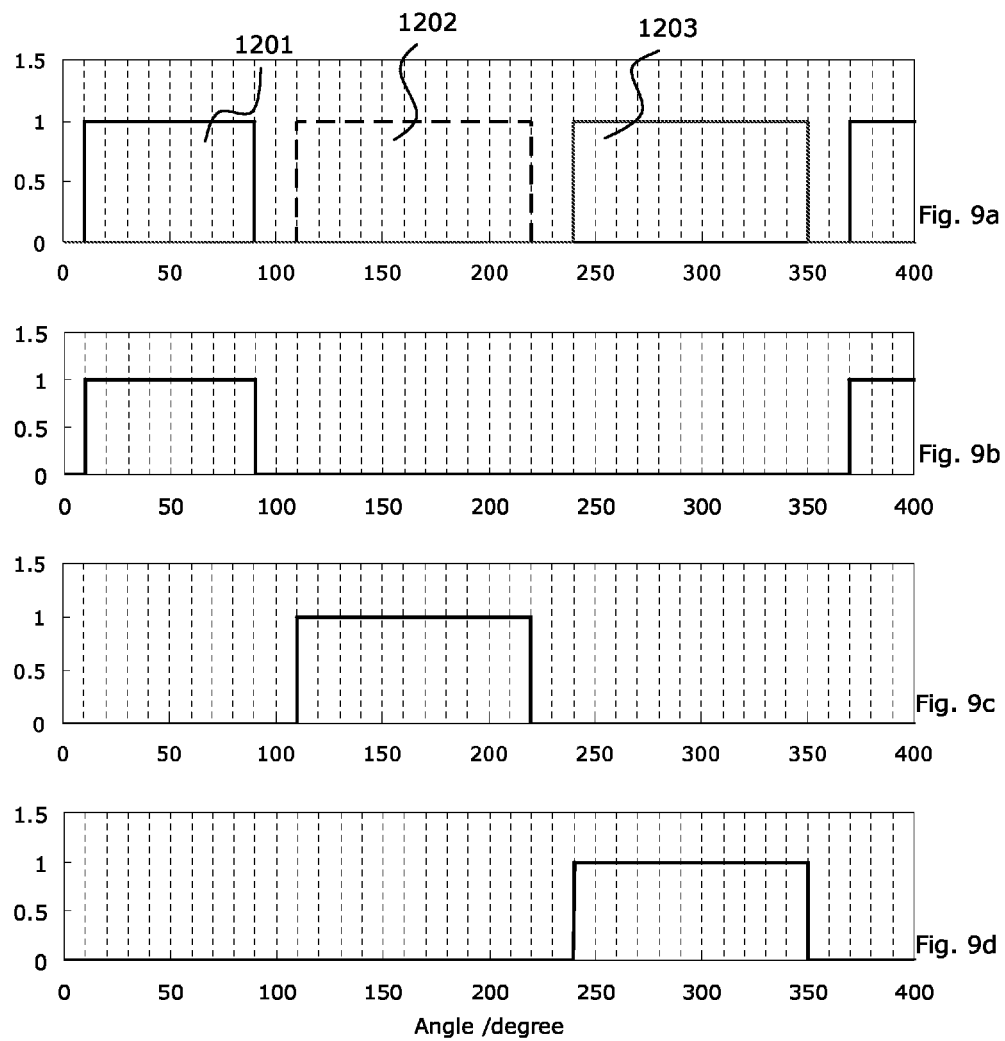

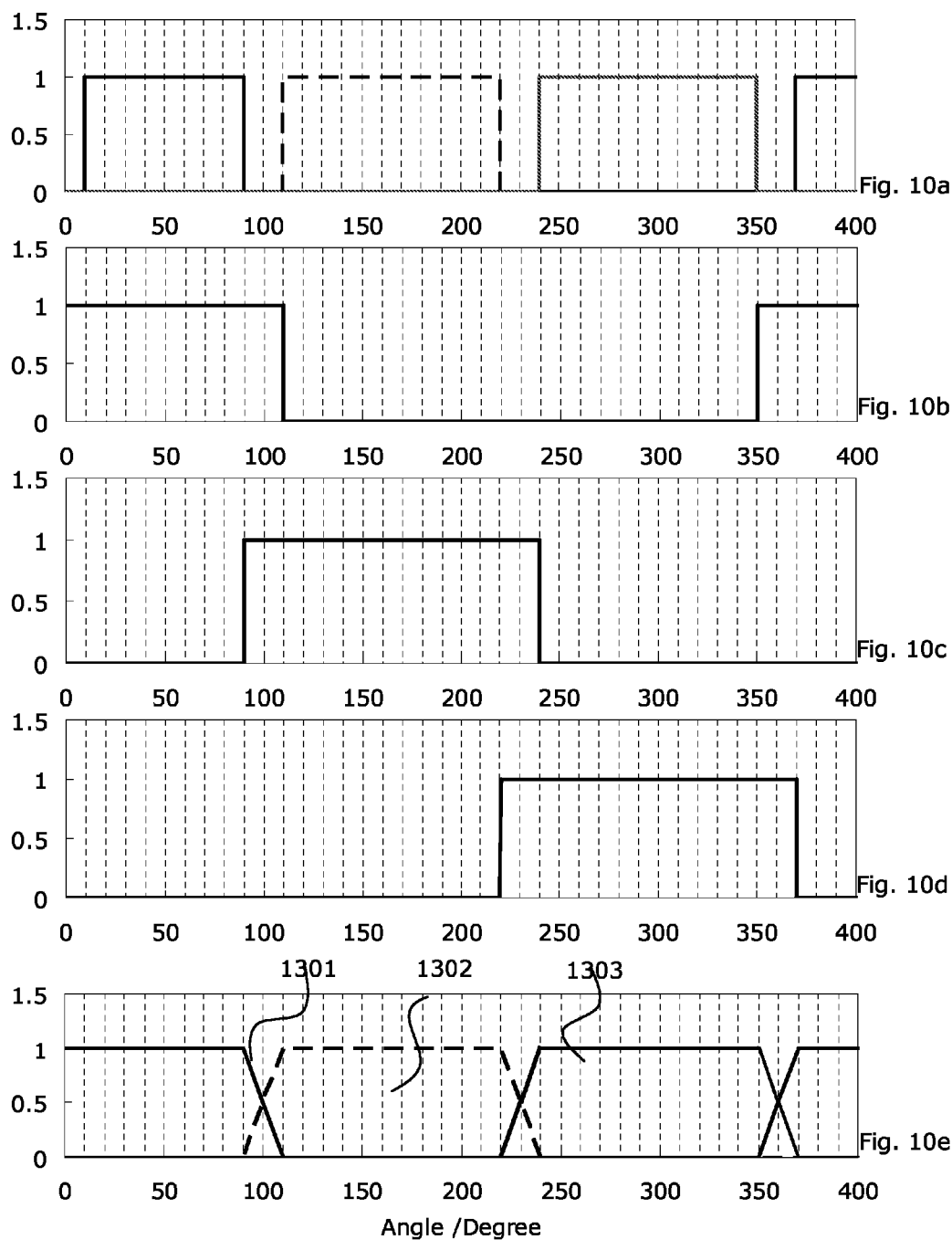

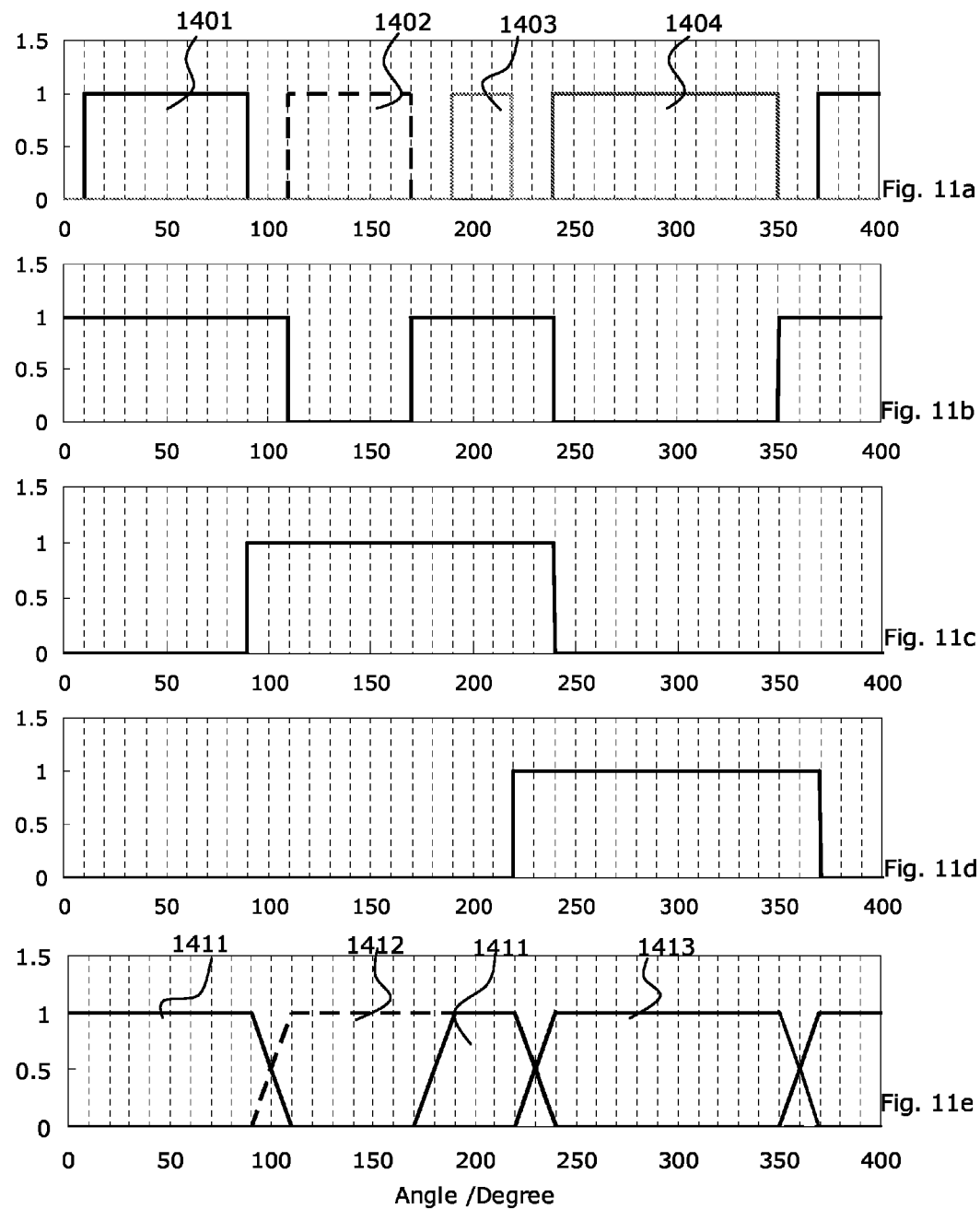

LIGHT SOURCE DEVICE AND PROJECTION DISPLAY METHOD

This application claims priority under 35 USC §119(e) from U.S. Provisional Patent Application No. 61/555967, filed Nov. 4, 2011, which is herein incorporated by reference in its entirety.

BACKGROUND OF THE INVENTION

1. Field of the Invention

This invention relates to lighting and display devices, and in particular, it relates to a light source device and projection system using the light source device.

2. Description of the Related Art

In a conventional projection system, three single-color images are projected onto a screen to form a single full-color image by integration effect of viewer's eye. Three separated modulators are often used to simultaneously modulate three primary-color images. For example, the light from a white light source is separated by a set of appropriate dichroic filters into three single-color lights, which are modulated respectively by three separated liquid crystal display (LCD) panels or three digital micromirror device (DMD) to generate three primary images. Alternatively, a single modulator with sequential color light could sequentially generate primary-color images. If the color light sequences through the three primary colors are fast enough, the viewer will not see the sequential color images but instead will see a full-color image. A sequential color light source is formed by combining a white light source and a filter means such as color filter.

A color wheel is typically a disk-shaped assembly of dichroic filters. The light comes from the white light is focused on the color wheel and filters, which are transmissive or reflective, to filter the input white light into single color lights. At least one color filter is included for each of primary color segment. FIG. 1 shows the transmission spectra of the three filters of a color wheel. The locations of the color wheel and the light source are relatively fixed so that the focus point of the white light on the color wheel is stationary. Spinning the color wheel so that each of the filters passes through the point at which the white light strikes the wheel generates a sequential primary-color light beam. The color wheel is typically spun fast enough to provide at least one primary color for each primary in each frame of a video image to avoid the detection of the sequential color nature on the screen by the viewer.

While a sequential color display system typically costs less than a simultaneous color system, images created by a sequential filtered color display system are not as bright as images created by simultaneous color display systems using the same light source. This is because at any given time only a portion the light generated by the light source is used to form the image. Additionally, when a sequential filter such as color wheel is used, the light during the filter transitions, typically called spoke light, will be a varying mixture of the two filters being changed in and out. This mixed-color light cannot be used by the same way of the pure color light since using the mixed color light would adversely affect the color purity of the created image.

A solution to the spoke light is to turn off the modulator during the spoke period, which refers to the time period of the filter transition. When the spoke period is turned off, light from the color wheel still passes to the light modulator, but just isn't used to contribute to the image brightness. Because the total spoke periods often take a proportion of 10%~20% of each frame period, turning off the spoke period will result in a dramatic degradation of brightness.

Several methods and apparatuses are presented to solve this problem. Patent U.S. Pat. No. 6,324,006 disclosed a method to utilize the spoke period for each pixel by different spoke-bit to keep the image artifacts below a perceptible threshold. US 2005168454 disclosed another method in which some of the spoke period could be used to contribute to the image when the color wheel in this system includes at least one neutral density (ND) segment. US 2006192734 disclosed another method to turn on the spoke periods while at least one primary-color is controlled to be decreased to compensate the chromatic artifact duo to the spoke period light.

These prior art display systems and methods have been used to maximize the image brightness by spoke light recapture (SLR) mechanism. The white-light source they used, however, is usually a UHP lamp, which typically has a short lifetime of 3000 hours. Additionally, the UHP lamp contains mercury which is not environmental-friendly. Solid-state light sources are developed in recent years, which have a long lifetime of more than 50000 hours, and contain no harmful ingredients. Therefore, Solid-state light sources such as light emitting diode (LED) can potentially replace UHP lamps.

As mentioned above in a single-modulator system a sequential color light source is required to sequentially generate three primary-color images. Different from the architecture of combination of white-light source and color wheel, three single-color solid-state light sources, such as red, green and blue LED sources, are combined by a set of dichroic filters in wavelength domain to act as a full-band light source. FIG. 3 illustrates a schematic view of single-modulator projection display system which makes use of solid-state light sources as an illuminator.

In FIG. 3, reference symbols 501, 502 and 503 refer to red (R), green (G) and blue (B) LED sources respectively. Dichroic filter 504 is transmissive to green and red light and reflective to blue light, while another dichroic filter 505 is transmissive to green and blue light and reflective to red light. These two dichroic filters combine the three primary lights by transmitting and reflecting them to a same exit to generate a full-band light source, whose spectrum is shown in FIG. 7, in which reference symbols 1001, 1002 and 1003 refer to blue, green and red color components respectively.

In FIG. 3 the combined full-band light is collected and focused onto the modulator 506 by a set of lens to generate modulated light, which is projected by a projection lens 507 to a screen (not shown). To generate sequential color light, a controller 512 is also used to respectively control light sources 501~503 to turn on and off in sequence, based on a sync signal from the modulator 506 through the connection 508.

SUMMARY OF THE INVENTION

However, a simple replacement with the solid state light source typically causes color or grayscale problems due to SLR, which is usually implemented in the projection display systems that use UHP white lamps. To use the solid state light source in projection display systems that implement SLR, a new control method needs to be developed.

Accordingly, the present invention is directed to a solid state light source device for a projection system that substantially obviates one or more of the problems due to limitations and disadvantages of the related art.

An object of the present invention is to provide a solid state light source device that is compatible with conventional projection system using a modulator that implements spoke light recapture.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a light source device which includes: a first solid state light source for generating a first color light; a second solid state light source for generating a second color light; a light combining device for receiving the first and second color lights and combining them into a combined light beam; a color filter device disposed to receive a light spot generated by the combined light beam, including a first filter segment transmitting at least a portion of the first color light and a second filter segment transmitting at least a portion of the second color light, wherein portions of the first and second filter segments define one or more spoke ranges located near one or more boundaries between adjacent ones of the first and second filter segments, including a first spoke range located near a first boundary between the first and second filter segments; a drive mechanism driving the color filter device to move periodically, wherein the first and second filter segments and the first spoke range are alternately disposed on a path of the combined light beam to be illuminated by the light spot when the color filter device moves; and a light source control device for controlling the first and second light sources, wherein the light source control device turns on only the first light source when at least a portion of the light spot is located in the first filter segment outside of any spoke range, turns on only the second light source when at least a portion of the light spot is located in the second filter segment outside of any spoke range, and turns on both the first and the second light sources when the light spot is located entirely in the first spoke range.

In various embodiments, the color filter device may have two, three, four, or six color filter segments.

In another aspect, the present invention provides a projector system which includes the above light source device and a light modulator for modulating light from the color filter device of the light source device to form an image.

In another aspect, the present invention provides a method for providing a light source which includes: generating a first color light using a first solid state light source; generating a second color light using a second solid state light source; combining the first and second color lights into a combined light beam using a light combining device; providing a color filter device disposed to receive a light spot generated by the combined light beam, the color filter including a first filter segment transmitting at least a portion of the first color light and a second filter segment transmitting at least a portion of the second color light, wherein portions of the first and second filter segments define one or more spoke ranges located near one or more boundaries between adjacent ones of the first and second filter segments, including a first spoke range located near a first boundary between the first and second filter segments; moving the color filter device periodically, wherein the first and second filter segments and the first spoke range are alternately disposed on a path of the combined light beam to be illuminated by the light spot when the color filter device moves; and controlling the first and second light sources using a light source control device, including: turning on only the first light source when at least a portion of the light spot is located in the first filter segment outside of any spoke range, turning on only the second light source when at least a portion of the light spot is located in the second filter segment outside of any spoke range, and turning on both the first and the second light sources when the light spot is located entirely in the first spoke range.

It is to be understood that both the foregoing general description and the following detailed description are exemplary and explanatory and are intended to provide further explanation of the invention as claimed.

BRIEF DESCRIPTION OF THE DRAWINGS

FIGS. 9a~d illustrate the control method according to a second embodiment of the present invention.

FIGS. 10a~e illustrate the control method and the light output according to a third embodiment of the present invention.

FIGS. 11a~f illustrate the control method and the light output according to a fourth embodiment of the present invention.

DETAILED DESCRIPTION OF THE PREFERRED EMBODIMENTS

Figure 4:
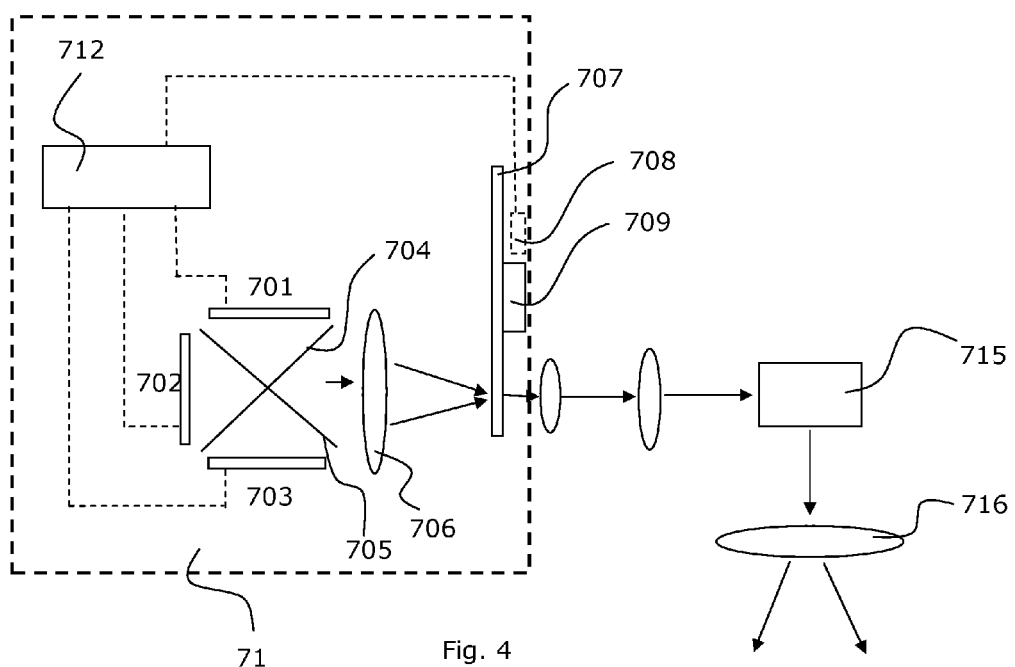
FIG. 4 illustrates a schematic view of a projection system according to a first embodiment of the present invention.

FIG. 4 is a schematic view of a projection system according to a first embodiment of the present invention. The sequential color light source 71 includes three primary color light sources 701, 702 and 703, a light source controller 712 and a color wheel 707. The color wheel is driven by a drive mechanism 709 to rotate. The sequential color light beam generated from the sequential color light source 71 is collected and focused onto a modulator 715, and the modulated light from the modulator is projected by projection lens 716 onto a screen (not shown) to form an image. A sensor 708 is disposed near the rotation axis of the color wheel 707 to monitor the rotation phase of the color wheel and generate a series of sync signals which are synchronized with the rotation of the wheel.

Figure 2:
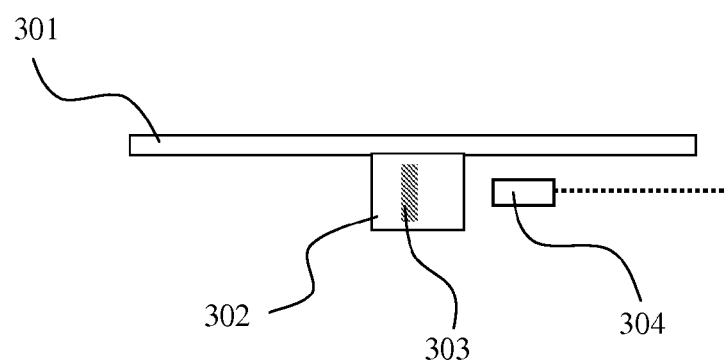
FIG. 2 illustrates an example of the structure of a color wheel and its associated sensor.

Many kinds of monitoring mechanism for the sensor 708 can be used. FIG. 2 shows the schematic view of one example. A black tape strip 303 is adhered on the side wall of the rotation axis (the shaft) 302 of the color wheel 301, and a sensor 304 is located adjacent the rotation axis to monitor the black tape. When the black tape moves through in front of the sensor as the shaft rotates by the rotating motor, one signal, for example a high voltage level, will be generated by the sensor; and when the black tape moves pass the sensor, the sensor output become low voltage level, until the black tape moves in front of the sensor again after one cycle. The location of the strip 303 relative to the various filter segments on the color wheel is known beforehand. So the output signal from the sensor, which is a pulse signal with the same frequency as the motor rotation, can indicate the current position of the wheel segments, including which color segment is disposed at the point where the light from the source strikes the wheel.

In FIG. 4, three primary light beams from primary light sources 701~703 are combined by dichroic filters 704 and 705 into a single light beam, which is collected by a condenser lens 706 and focused onto the color wheel 707. The light source controller 712 is used to receive the sync signal from sensor 708 and use the signal to control the primary light sources respectively.

More specifically, the dichroic filter 704 transmits the light from the light sources 701 and 702, and reflects the light from the light source 703, and dichroic filter 705 transmits the light from the light sources 702 and 703, and reflects the light from the light source 701. By using these two orthogonal dichroic filters, three primary lights can be combined in the wavelength domain. The X-shaped dichroic filters set in this embodiment is not the only way for light combination; those skilled in the art will appreciate that besides the X-shaped dichroic filter set, other color combiners can be used to combine the primary lights with different wavelength band. Examples of such color combiners include an X cube color combiner, parallel placed dichroic color filters, color filters configured in other arrangements, etc.

The condenser lens 706 can be replaced by other suitable light collecting devices, such as CPC (compound parabolic concentrator), light rods, etc. Its function is to reduce the divergent angle of the light, which helps reducing loss due to angular dependence of the color filters of the color wheel 707.

In this embodiment, there are three sets of primary light source, for example, red (R), green (G) and blue (B) sources. For each of the primary light source, there are several implementations, described below with reference to FIG. 5a ~5g.

Figure 5A:
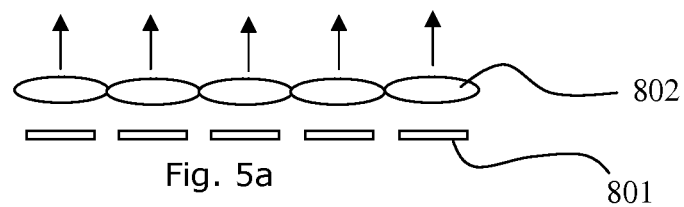
FIGS. 5a~g illustrate various kinds of light source structures that can be used in embodiments of the present invention.
Figure 5B:
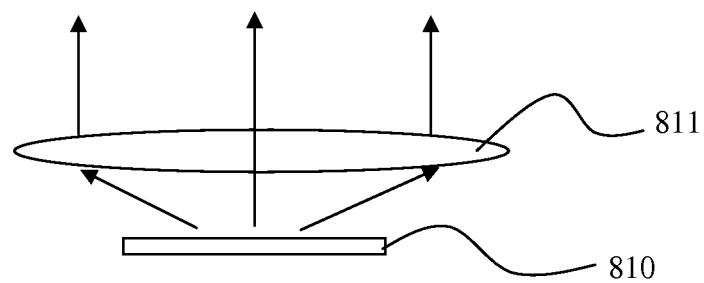

FIGS. 5a and 5b illustrate the schematic view of a first implementation which includes an LED array or a large LED chip. In FIG. 5a, an LED chip array 801 is formed by multiple LED chips arranged in a plane, and a lens array 802 above the LED chip array collimates the light emitted from each LED chip. Each LED chip corresponds in position with at least one cell (lens) of the lens array. Besides an LED array, special LED chip can be used with customized size and shape. In FIG. 5b, a large LED chip 810 is used to emit light, which is collimated by a large collimator 811. The collimator 811 in FIG. 5b is a lens shape; in fact, it may be a TIR (total internal reflection) lens or a Fresnel lens.

Figure 5C:
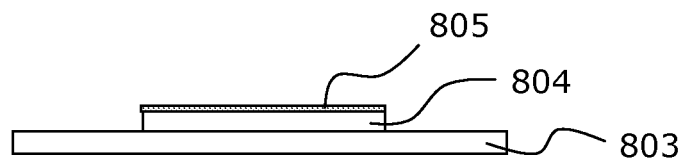

FIG. 5c illustrates the schematic view of a second implementation. An LED chip 804 is mounted on a substrate 803, and a phosphor layer 805 is coated on the LED chip's top surface. The phosphor layer absorbs the light from LED chip and emits light with different wavelengths. For example, a blue or ultraviolet LED chip with a green phosphor coating will emit green light. In this disclosure, this kind of light source is referred to as "phosphor LED". In this example, a green phosphor LED is more efficient than green LED.

Figure 5D:
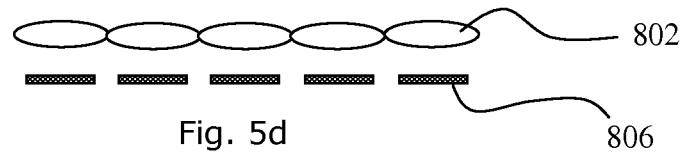

Like the LED shown in FIGS. 5a and 58b, the phosphor LEDs can also be used as a phosphor LED array, or a large phosphor LED chip, used with lens array or a collimator for collimation respectively. A phosphor LED array is shown in FIG. 5d, where reference symbol 806 refers to a phosphor LED array.

Figure 5E:
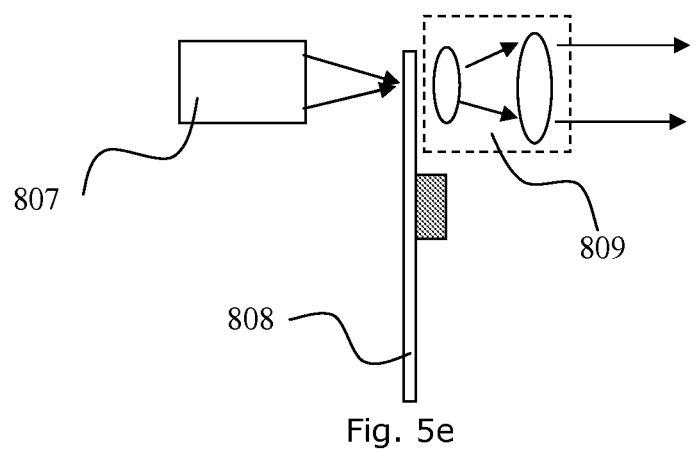

FIG. 5e illustrates the schematic view of a third implementation. A phosphor wheel 808 is excited by a pumping light from a pumping source (excitation source) 807. One or more phosphor layer is coated on the phosphor wheel surface, and the emission light from the phosphor layer is collected and collimated by a set of collection lens 809. For example, a green phosphor layer can be coated on the surface of the wheel, and excited by a blue pumping light to emit a green collimating light after the collection lens. Multiple phosphor layers may be used in this implementation, but the output converted light should remain stable in the time domain. The phosphor wheel 808 rotates, and as a result, phosphors in different areas of the phosphor wheel are exposed to the pumping light. This reduces heat buildup so the output brightness can be increased. As alternatives to a rotating wheel, rotating phosphor cylinder or linearly moving phosphor plate may be used. The pumping source 807 is made of LED or laser diode (LD). If a LD or LD array is used as pumping source, because of its small etendue, the brightness after the phosphor wheel is much higher than the implementation shown in FIG. 5a~5d.

The above three implementations are all based on solid-state lighting technology (including LED, LD and phosphor technology). They all can be modulated rapidly in time domain by a controller. These examples are not limited to other possible solid-state solutions.

Figure 5F:
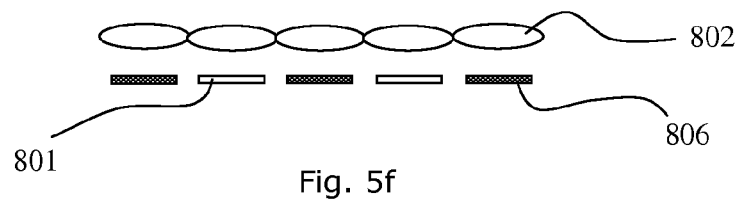

For each primary light source, more than one implementation may be used together, an example is shown in FIG. 5f. In FIG. 5f, the LED array is a mixture of LED chip 801 and phosphor LED chip 806. In this example, for each single LED chip of 801, there are phosphor LED chips of 806 as neighbors. This configuration leads to a uniform output of the mixture of light.

Figure 5G:
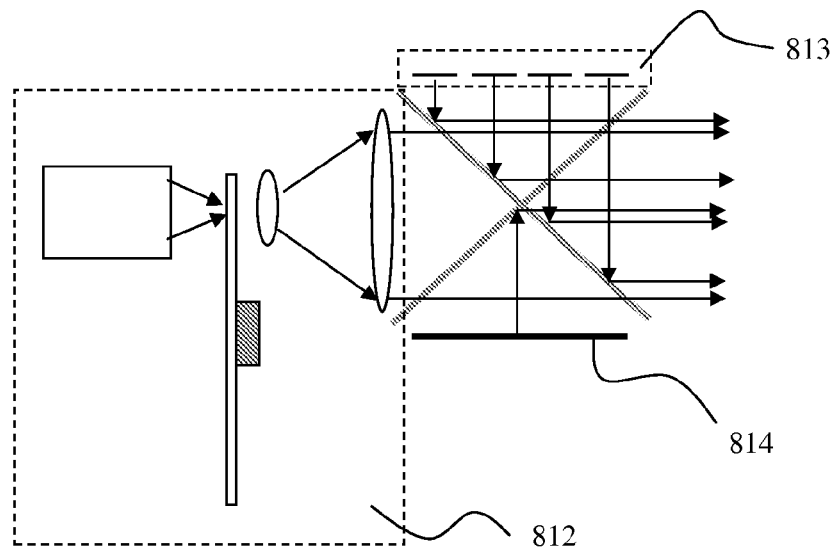

The implementation for each primary light source may be different, an example of which is shown in FIG. 5g. In this example, the green light source 812 is based on the configuration shown in FIG. 5e, the red light source 813 is a red phosphor LED array, and blue light source 814 is a large blue chip. This combination is merely an example but it does not limit the invention. In fact, for each primary light source all the possible implementations mentioned above may be used, and the choice can be made based on practical considerations.

Figure 6:
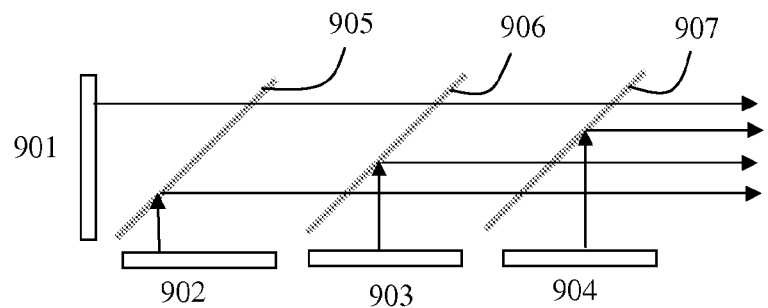
FIG. 6 illustrates a schematic view of a light source with four primary light sources that can be used in embodiments of the present invention.

On the other hand, more than three primary light sources may also be used in this embodiment, an example of which is shown in FIG. 6. Four primary light sources 901, 902, 903 and 904 are used to emit four lights with different wavelength, and three parallel dichroic filters 905, 905 and 907 are used to combine the four lights in a similar manner as the three light combination method described above. It is known that multiple lights with different wavelength can be combined in the wavelength domain, regardless of the number of lights.

FIGS. 5a~5g and FIG. 6 show some possible implementations of the optical structure of the present invention. The working process and control methods will be disclosed with reference back to FIG. 4.

In FIG. 4, the source controller 712 respectively controls each primary light source to turn on and off, or change the brightness of the light it generates. For the implementations shown in FIG. 5a~5d, the source controller 712 directly controls the lighting states (on and off) of LED or phosphor LED; for the implementation shown in FIG. 5e, the source controller 712 control the lighting state (on and off) of the pumping source 807 to indirectly control the output light of the phosphor wheel 808.

Figure 1:
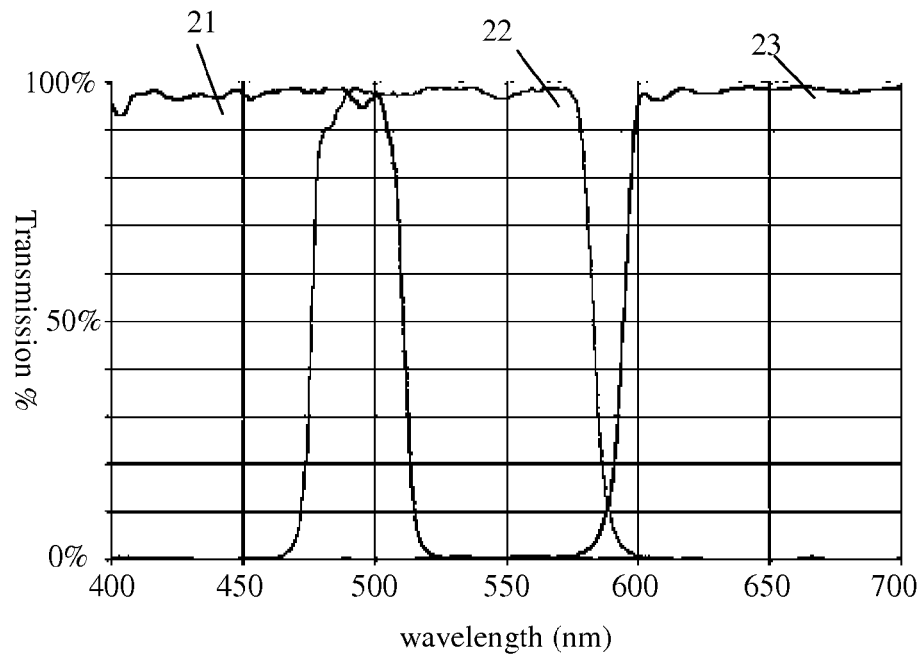
FIG. 1 illustrates an example of filter spectra of color filter segments in a color wheel.
Figure 7:
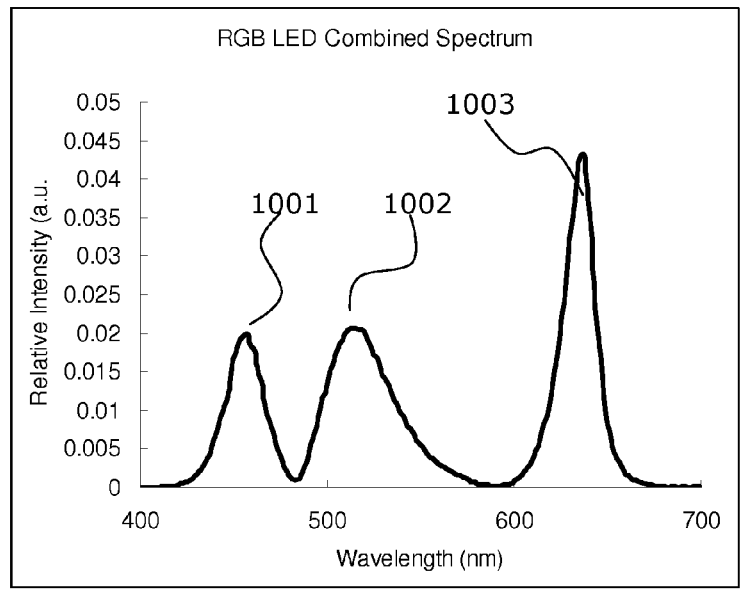
FIG. 7 illustrates the spectrum of output light generated by the light combination device of the first embodiment.

In a first control method according to an embodiment of this invention, the source controller 712 controls all of the primary light sources to work in a continuous mode, which means driving the solid-state components shown in FIG. 5a~5g with a constant direct current, and the light output of each primary light source is substantially stable in the time domain. Under this working mode, combining all the primary lights, the light source 71 emits a stable white light. If the three primary light sources are RGB LEDs, the spectrum of the white output light from 71 will be that shown in FIG. 7, where reference symbols 1001, 1002 and 1003 refer to the blue, green and red light components, respectively. Compared with FIG. 1 which illustrates typical transmissive bands of each color filter 21, 22, 23 in a RGB color wheel, it is obvious that the blue light, green light and red light can respectively transmit through the filters 21, 22, 23 with little loss.

Although the above embodiment works well, the system efficiency is low because for each color segment, light energy of other color will be blocked by the filter. For example, for red segment the red filter will transmit red light while reflecting blue and green light. In a second embodiment of the present invention, when one of the color segments in the color wheel 707 is disposed in the position where the input light strikes, only the corresponding primary light sources are turned on, and the other primary light sources are turned off. Because no light is reflected by the color filter, this embodiment is much more energy-efficient compared with the first constant driving method.

Figure 3:
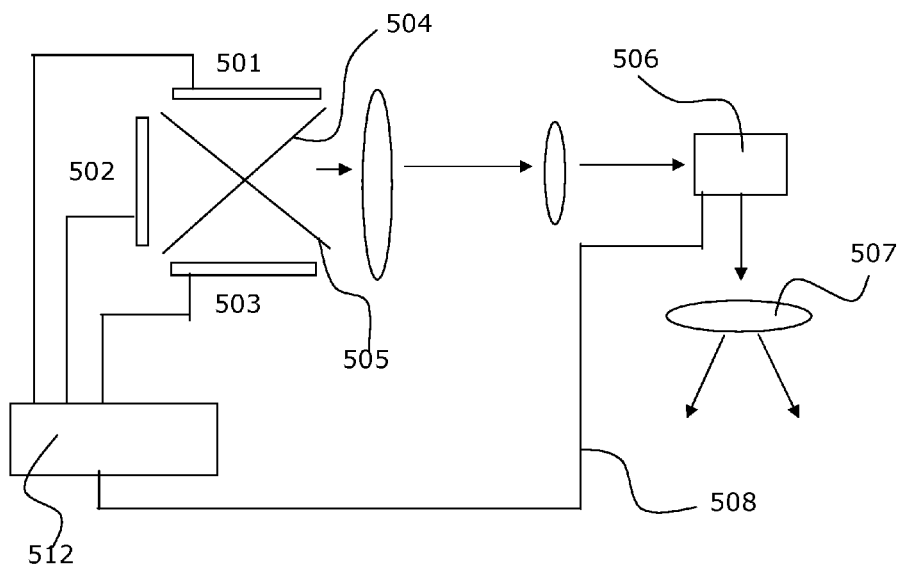
FIG. 3 illustrates a schematic view of a known projection system.

The modulator 715 is one that incorporates conventional spoke light recapture (SLR) mechanism. Thus, spoke lights still needed to be compatible with the modulator 715. That is because the SLR mechanism, which is designed for making use of spoke light, is mostly designed for modulators in UHP-lamp-based projection systems. Different from the conventional device illustrated in FIG. 3, the second embodiment of the present invention can generate spoke lights using a simple control method.

Figure 8:
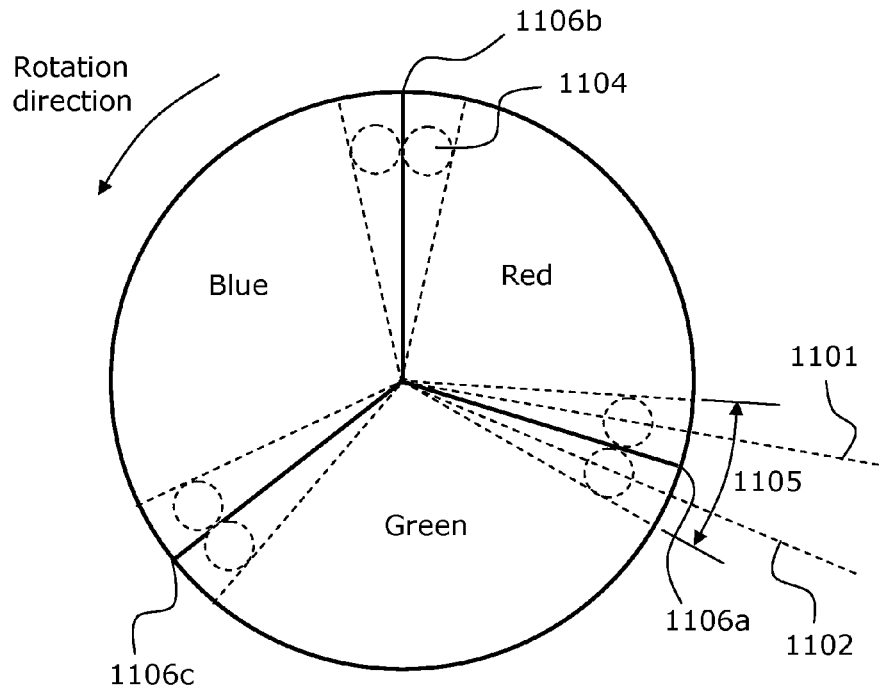
FIG. 8 illustrates a color wheel the spoke ranges in the color wheel.

Take an RGB color wheel for example. FIG. 8 shows a plan view of the filter plane in the color wheel. Reference symbol 1006a refers to the boundary of the red and green filters, reference symbol 1006b refers to the boundary of the red and blue filters, and reference symbol 1006c refers to the boundary of the green and blue filters (the filters are labeled "Red", "Green" and "Blue" in FIG. 8). The light from the light source is focused on the color wheel to form a stationary light spot, which is illustrated by reference symbol 1104. Because the filters of the color wheel will move with respect to the light spot when the color wheel rotates (as indicated by the label "Rotation direction" in FIG. 8), for convenient of description in FIG. 8 the light spot is shown to move with respect to the wheel.

Radial line 1101 shows the point at which the light spot first reaches the green filter segment. Thus when the center of the white light spot crosses radial line 1101, the color produced by the filter wheel begins to transition from red to green. When the light spot is centered on the radial line 1102, only green light is produced by the color wheel. Therefore, the radial lines 1101 and 1102 are separated by the white light spot at the point the center of the white light spot crosses the radials. Reference symbol 1105 refers to the angular range of the light spot within which red-green spoke light is generated (the spoke range). As shown in the figure, the spoke ranges are located near the boundaries of two adjacent color filter segments.

One solution to spoke light is to turn off the spoke. Different from that case of UHP-lamp-based system, the solid state light source in embodiments of the present invention can be turned off at the same time to save energy. For example, in the color wheel shown in FIG. 8, the blue and green filter segments are 130 degrees in angular size, and the red filter segment is 100 degrees. The spoke range 1105 is 20 degrees. Defining the relative angle of the position 1106b as 0, the angle range for red single light output is from 10 degrees to 90 degrees, that for green single light output is from 110 degrees to 220 degrees, and that for blue single light output is from 240 degrees to 350 degrees. The angle range of each segment and its spoke ranges are shown in Table 1.

TABLE 1

|  | Start angle/degree | End angle/degree |
|---|---|---|
| Red output | 10 | 90 |
| R-G spoke | 90 | 110 |
| Green output | 110 | 220 |
| G-B spoke | 220 | 240 |
| Blue output | 240 | 350 |
| B-R spoke | 350 | 370 (10) |

FIG. 9a illustrates the angle ranges shown in Table 1. Reference symbols 1201~1203 refer to the angular ranges of red, green and blue single lights respectively, and between every two color ranges there is a spoke range. FIG. 9b~9d refer to the control (on/off) state of the RGB light sources respectively, where 0 means off state while 1 means on state. Take FIG. 9b for example. When the filter section corresponding to the range of red output light, from 10 degrees to 90 degrees, is in the input light path (i.e. the path of the light from the light combination device), the red light source is turned on by the source controller 712, and at other position the red light source is turned off. This kind of synchronization control mode is based the sync signal generated by the color wheel sensor.

In this embodiment, the primary light sources are turned on and off in turn to match with the color status of the color wheel, and for each spoke range all the primary sources are turned off. This method would deliver a very good display performance, especially color performance, but the brightness is reduced because the three spoke ranges are wasted (no output light in the spoke ranges).

FIG. 10a~10e illustrate a third embodiment of the present invention. With the same color wheel shown in FIG. 9a and Table 1, the angular range of the RGB segments are shown in FIG. 10a again for convenient comparison with FIG. 10b~10e. In this embodiment, when a spoke range is in the input light path, both primary light sources on both sides of the spoke range are turned on. FIGS. 10b to 10d refer to the control states of the RGB light sources respectively, where 0 means off state while 1 means on state. Take FIG. 10b for example. When the position of red output light, from 10 degrees to 90 degrees, is in the input light path, the red light source is turned on by the source controller 712, and when the positions of B-R spoke range (from 350 degrees to 370 degrees) and R-G spoke range (from 90 degrees to 110 degrees) are in the input light path, the red light source is turned on as well. At other position the red light source is turned off. The other primary color lights are similarly turned on for their own filter segments as well as the two spoke ranges before and after the respective spoke ranges, as shown in FIGS. 10c and 10d. The angle range of the on state for each primary light source is listed in Table 2.

TABLE 2

|  | Start angle/degree | End angle/degree |
| --- | --- | --- |
| Red source on | 350 (−10) | 110 |
| Green source on | 90 | 240 |
| Blue source on | 220 | 370 (10) |

In each spoke range, the light spot moves from one color filter to another. Take the example of FIG. 1 and FIG. 7, each primary color light can only transmit through its corresponding filter, and will be reflected by other filters. So when the light spot moves in a spoke range from color segment 1 to color segment 2, the color light of color segment 1 will decrease and color light of color segment 2 will increase gradually. The output primary lights after the color wheel is shown in FIG. 10e, where reference symbol 1301 refers to the red output light, reference symbol 1302 refers to the green output light and reference symbol 1303 refers to the blue output light, and where 1 means light on (full brightness) and 0 means light off. In this embodiment, in each spoke range both primary lights on both side of the spoke range will be lost for about a half of the lighting power, but compared with the second embodiment, the total light output after the color wheel is increased because the spoke ranges are used for lighting.

Because of possible imprecision in primary light control, the angle range of turning on for each primary light source may be increases to maintain a controlling margin. For instance, as shown in Table 2, the green source would be turned on from 90 degree to 240 degree to cover both green light output range and two spoke ranges; in practice the green light source maybe turned on from 85 degree to 245 degree to maintain a margin of 5 degree at both side for ease of control.

In the second and third embodiment described above, a RGB wheel is used as an example. Alternatively, other color wheel may also be used in the present invention. In the fourth embodiment, a RGYB color wheel is used for example. The color segments configuration of this wheel is shown in Table 3.

TABLE 3

|  | Start angle/degree | End angle/degree |
| --- | --- | --- |
| Red output | 10 | 90 |
| R-G spoke | 90 | 110 |
| Green output | 110 | 170 |
| G-Y spoke | 170 | 190 |
| Yellow output | 190 | 220 |
| Y-B spoke | 220 | 240 |
| Blue output | 240 | 350 |
| B-R spoke | 350 | 370 (10) |

Figure 11F:
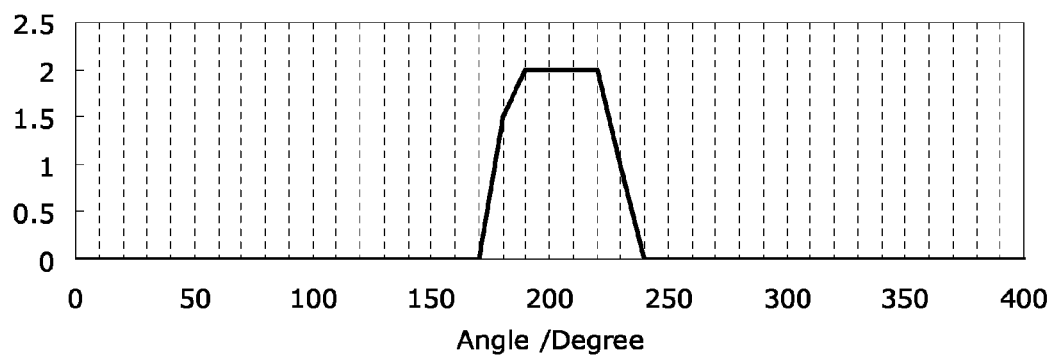

FIG. 11a~11f illustrate the control state and lighting state for each primary light in this embodiment. According to Table 3 and FIG. 11a, references symbols 1401~1404 refer to red, green, yellow and blue color light output ranges, and between two adjacent color ranges, there is a spoke range of 20 degrees. For red, green and blue color segments, the control state is similar to that in the third embodiment. For the yellow segment, the yellow light may be obtained by combining red light and green light; the filter for the yellow segment transmits red light and green light, and reflects blue light. So in yellow light output range, and G-Y spoke range and Y-B spoke range, both red light and green light are turned on. The control state of red, green and blue primary light sources are shown as FIG. 11b~11d respectively, and each primary light output after the color wheel is shown in FIG. 11e, where reference symbols 1411~1413 refer to red, green and blue light respectively.

FIG. 11f illustrates the output light of the yellow segment, where in the range from 190 degrees to 220 degrees, yellow light obtained by combining red and green light will be output after the color wheel, and in the ranges from 170 degrees to 190 degrees and from 220 degrees to 240 degrees a light that includes partially yellow light will be output.

In practice, in the yellow light segment, to get a satisfactory yellow color, the red light source and green light source maybe driven by different current levels (for DC driving method) or different duty cycles (for pulse driving method) from those used for the red and green segments, because both red and green color light source required to be adjusted to get a proper red to green light power proportion to obtain the desired yellow color. For instance, in the red segment the red source will be driven with the highest current level, but in yellow segment, because the green light is not bright enough to achieve the desired yellow color, the red light source will be driven at a lower current level, 80% of the highest level for example, to obtain the proper red to green light power proportion. This method is also suitable to generate a combination light by the primary lights, such as white light which will be described below.

In the fourth embodiment, two primary lights are turned on at the same time for another light segment in the color wheel. More generally, two, three or more primary color lights can be used to provide light for one of the light segments in the color wheel. For example, in an RGBW color wheel, the white segment is a transparent glass plate with or without anti-reflective coating. When the white segment is in the input light path, red, green and blue lights need to be turned on and combined to generate a white light.

In the description of the above embodiments, certain specific color wheel configurations and angular range values are used as examples. These examples are for purpose of illustration and the invention is not limited to these specific configurations and values; other kinds of color wheel and color segments arrangements can be used.

Figure 12:
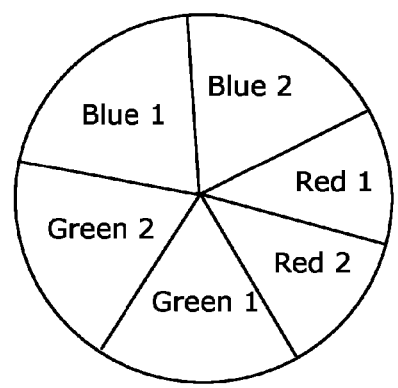
FIG. 12 illustrates a schematic view of the color wheel used in a fifth embodiment of the present invention.

As the fifth embodiment of the present invention, a color wheel for 3D display is used, whose structure is shown in FIG. 12. The other components of the projection system are the same or similar to those shown in FIG. 4 except as pointed out later (refer to the discussion of FIGS. 15a and 15b). In this 3D application, for each primary color light, two lights with different wavelengths are required (the corresponding filter segments are labeled "Red 1", "Red 2", "Green 1", "Green 2", "Blue 1", "Blue 2" in FIG. 12). For example, the pass band of the Red 1 filter is 610~630 nm, and the pass band of the Red 2 filter is 630~650 nm; these two red light look similar in color but can be separated by filters to display different images for the two eyes, respectively. For example, filters Red 1, Green 1 and Blue 1 can be used as one set of primary light to generate image 1 for the left eye, and filters Red 2, Green 2 and Blue 2 can be sued as another set of primary light to generate image 2 for right eye; 3D effect can be obtained by the different images 1 and 2.

Figure 13A:
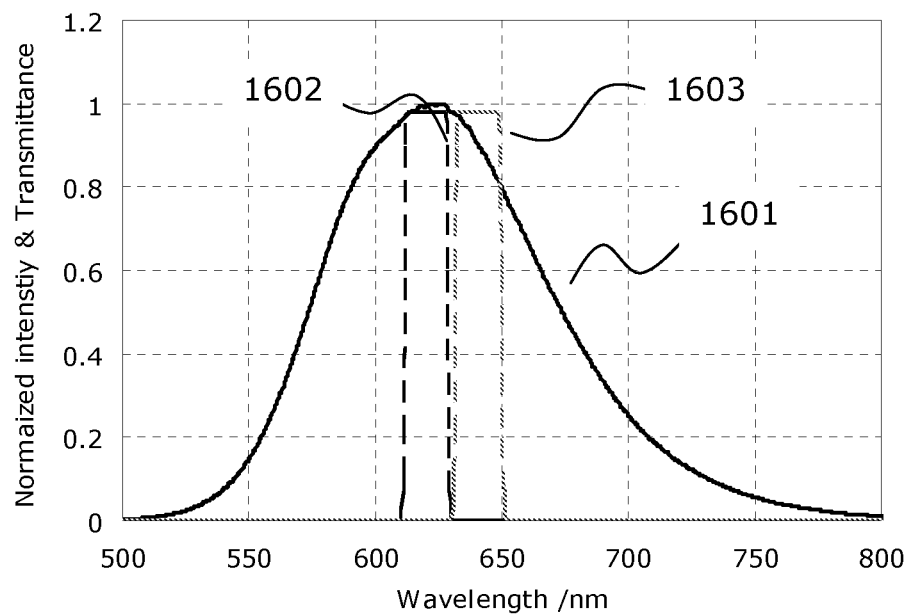
FIGS. 13a and 13b illustrate an example of red light spectra in one implementation of the fifth embodiment.
Figure 13B:
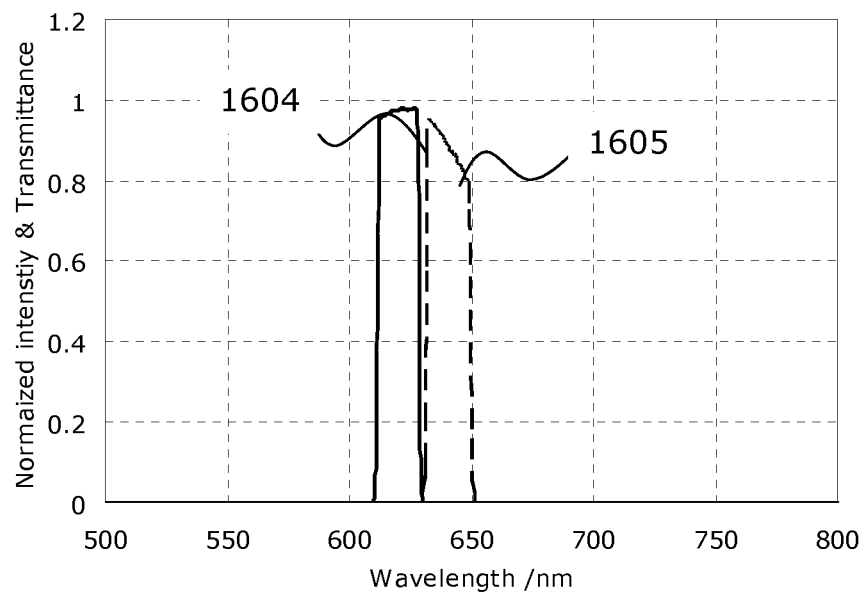

In this 3D application, there are several implementations of the light sources. The first implementation uses wide spectrum lights as primary lights. A wide spectrum primary light have a relatively wide spectrum range, which covers the two pass bands of the primary light filters for the left and right eyes respectively. For example, a red light with spectrum range from 500 nm to 800 nm may be used as the red primary light, as shown in FIG. 13a, where reference symbol 1601 refer to the spectrum of red primary light, and reference symbols 1602 and 1603 refer to the pass bands of Red 1 and Red 2 filters in the color wheel of FIG. 12, respectively. When the Red 1 segment, the Red 2 segment and their spoke range are in the input light path, the red primary light will be turned on, and different red color lights will be generated after the wheel. FIG. 13b shows the spectrums of the color light output of Red 1 (1604) and Red 2 (1605).

This implementation has the same optical structure as shown in FIG. 4, and the wide spectrum primary light may be obtained from a light source based on phosphor, such as the structure shown in FIG. 5c~5f. A disadvantage of this implementation is low efficiency, caused by the light power loss when the wide spectrum light is filtered by two narrow band pass filters.

Figure 14A:
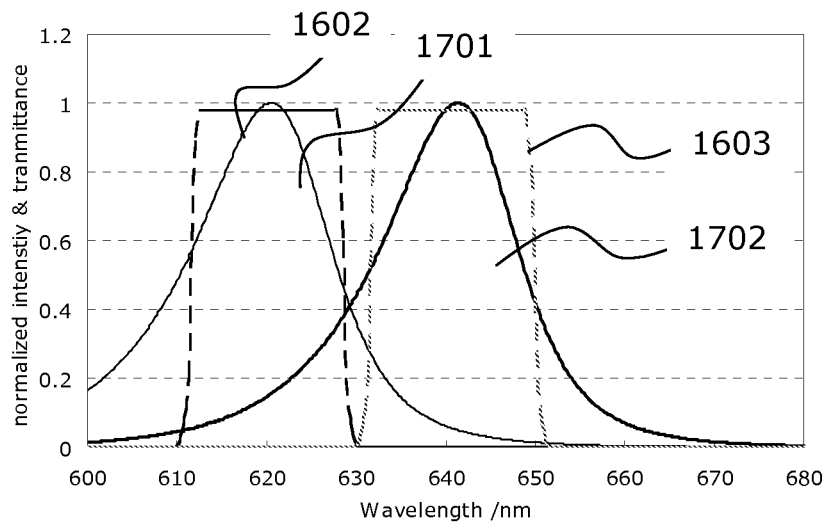
FIGS. 14a and 14b illustrate an example of red light spectra in a second implementation of the fifth embodiment
Figure 14B:
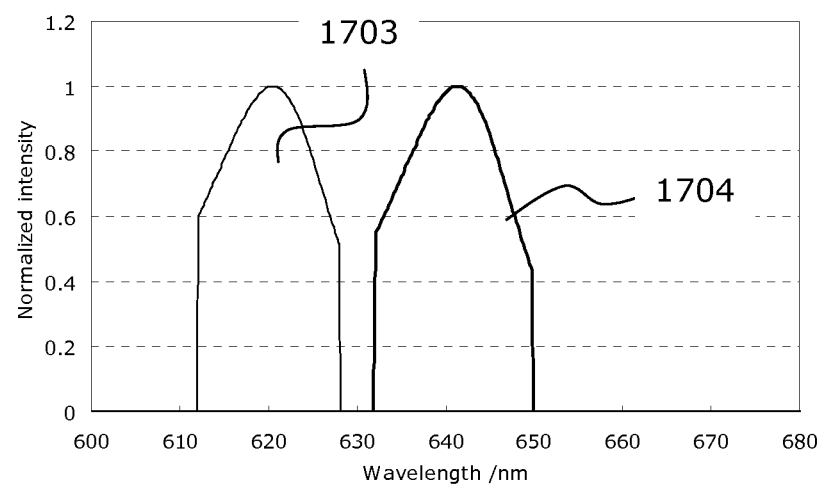

In a second implementation, two primary light sources with different wavelength range are used for the left and right eyes respectively. Take again the red primary light as an example, as shown in FIG. 14a. In this implementation, there are two red light sources, red light source 1 and red light source 2. Reference symbol 1701 refers to the spectrum of red light source 1, and reference symbol 1702 refers to the spectrum of red light source 2. Their spectra substantially cover the pass bands of red 1 and red 2 filters in the color wheel respectively, and the spectra of filtered lights are shown in FIG. 14b as curves 1703 and 1704. The light sources used in this implementation have narrow band spectra, which may be supplied by LEDs or laser diodes.

Figure 15A:
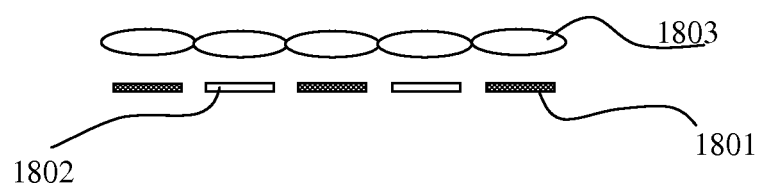
FIGS. 15a and 15b illustrate two alternative optical structures of a primary light source in the second implementation of the fifth embodiment.
Figure 15B:
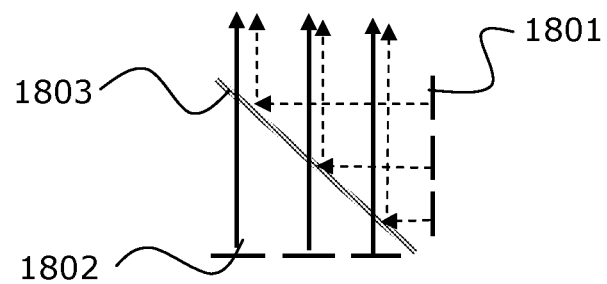

In this implementation, one primary light source includes two kinds of light emitting elements to emit lights with different wavelengths, corresponding to the primary colors in the color wheel for the left and right eyes respectively. There are various methods to combine lights from the two kinds of light emitting elements; one is to combine them by different locations, as shown in FIG. 15a. In FIG. 15a, reference symbols 1801 and 1802 refer to two kinds of light emitting elements, which are arranged are different location, and collimated by a lens array 1803. Through the lens array 1803 the collimated light bundles are combined into one bundle. Using this method, the bundle size will increase compare to the bundles of each light emitting element. Another method is to combine the two lights in the wavelength domain, as shown in FIG. 15b, by a dichroic filter 1803. The dichroic filter 1803 reflects light of one set of light emitting elements and transmits light of another set, and combines them to one bundle without bundle sized increase.

In the fifth embodiment of the present invention, the two implementations may be used at the same time for different primary light source.

Thus, the six filter segments shown in FIG. 12 can correspond to three to six different primary light sources. The control method for the fifth embodiment can be designed similar to that for the embodiment shown in FIGS. 9a-d, 10a-e or 11a-f, even though the number of primary light sources may be different. A detailed explanation is omitted here.

Figure 16:
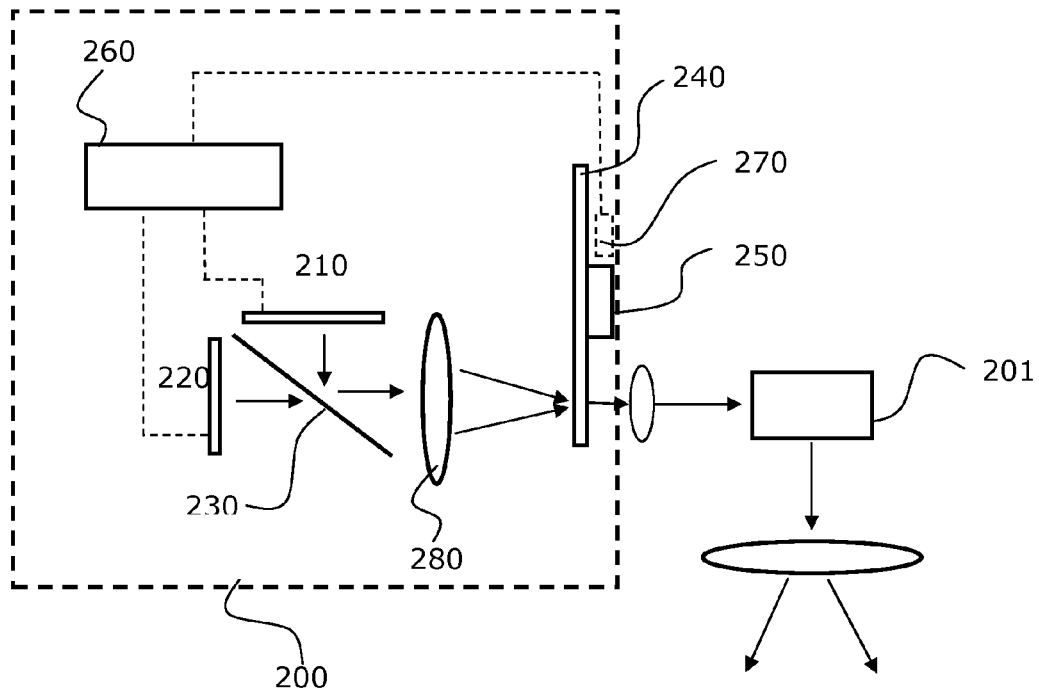
FIG. 16 illustrates a projection system according to a sixth embodiment of the present invention.
Figure 17:
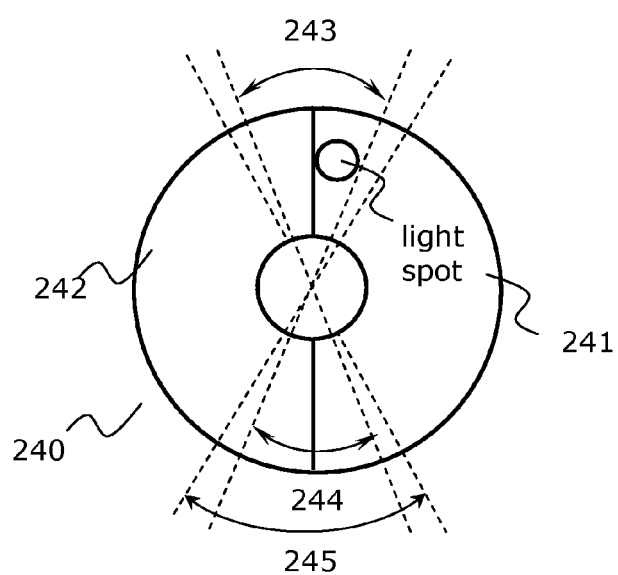
FIG. 17 illustrates a color wheel and the spoke range in the color wheel used in the sixth embodiment.

While the embodiment shown in FIG. 4, including the color wheel configuration shown in FIG. 8 and the light source control method shown in FIGS. 9a-d, 10a-e, and 11a-f, employs three primary color lights (red, green and blue), the invention may also be embodied in a system that employs two primary color lights. An example is shown in FIG. 16 and the corresponding color wheel is shown in FIG. 17. As shown in FIG. 16, the light source 200 in the sixth embodiment includes two color light sources 210 and 220, a light combiner 130, a light source controller 260, optics 280, a color wheel 240 rotating around an axis 250, and sensor 270. The projection system also includes a modulator 201 and projection optics. The two color light sources generate blue and yellow lights, respectively. Except for the number and color of the light sources, the components of this embodiment are similar to those of the embodiment shown in FIG. 4.

The color wheel 240 has two color filter segments 241 and 242 as shown in FIG. 17 (two spoke ranges are present because the two filter segments are arranged in a ring shape). The spoke ranges are indicated by arrows 243 and 244. When the light spot is completely located within a spoke range, the output light is a mixture of yellow and blue lights, i.e., spoke light.

Figure 18A:
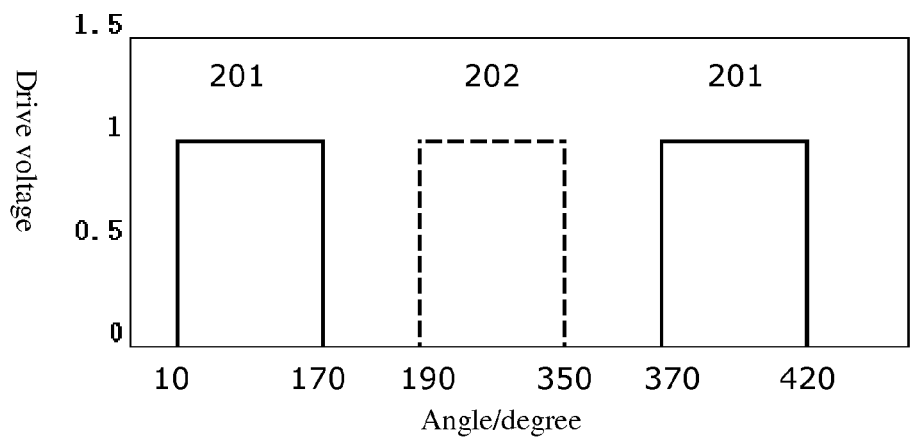
FIGS. 18a-d illustrate the control method and the light output according to the sixed embodiment.
Figure 18B:
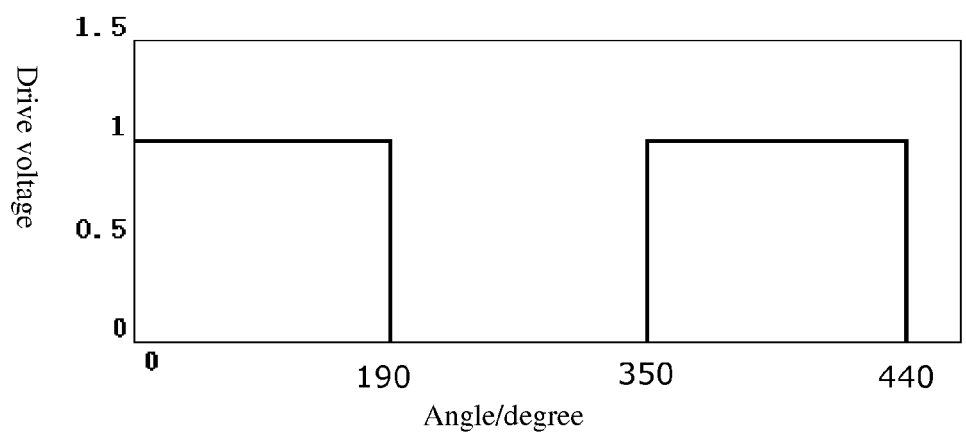
Figure 18C:
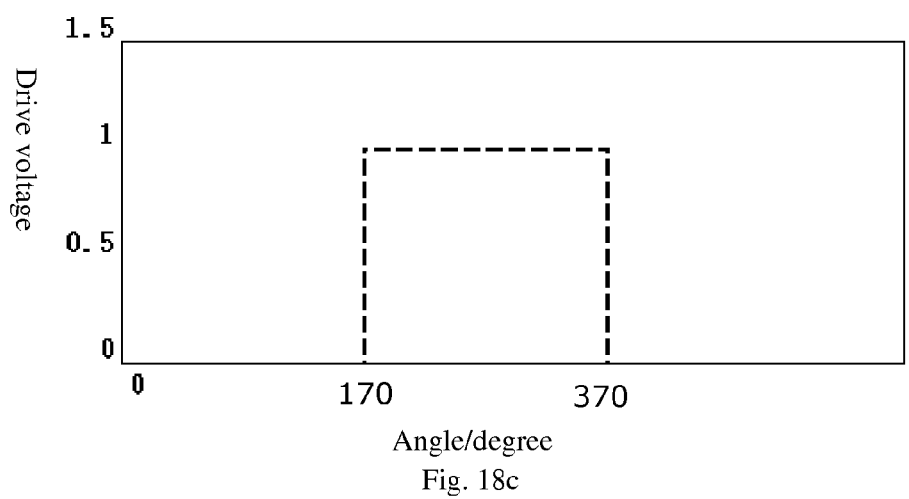
Figure 18D:
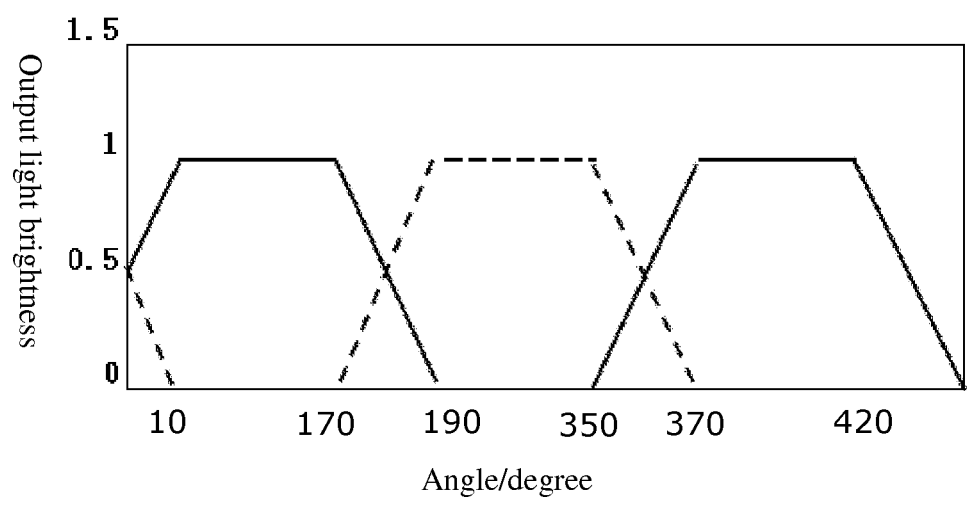

The control method for this embodiment is illustrated in FIGS. 18a-f. FIG. 18a illustrates the angular ranges of blue and yellow single lights respectively (201 and 202), and between every two color ranges there is a spoke range. FIGS. 18b and 18c illustrate the on/off states of the blue and yellow light sources, respectively. FIG. 18d illustrates the output brightness of the blue and yellow light after the color wheel. These figures are similar to FIGS. 10a-e and a detailed explanation is omitted here.

The angular range 245 shown in FIG. 17 depicts a more broadly defined spoke range, which may be used in practice to take into consideration the imprecision of the on/off control of the light sources. Correspondingly, the "on" periods of the blue and yellow light sources (refer to FIGS. 18b-c) will be wider. However, in the parts of the angular range 245 that lie outside of the angular range 244, even though both light sources are turned on, only one color light is transmitted through the color filter. Therefore, the output light brightness remains the same as that shown in FIG. 18d.

In various embodiments and implementations described above, in addition to turning on and off the primary color light sources at desired times, the relative output flux of the primary color light sources can be adjusted by changing their drive powers, for example, by adjusting current levels (for DC driving method) or duty cycles (for pulse driving method) of the drive signals supplied to the light sources. Thus, desired color balance or white balance can be achieved.

In various embodiments and implementations described above, a rotating flat wheel (the color wheel) is used as an example a color filter device having multiple filter segments forming spoke ranges between the segments. More generally, the color filter device may have other shapes and spatial arrangements of color filter segments, for example, a rotating cylinder, a linearly oscillating plate, etc. The drive mechanism drives the color filter device to move periodically.

The projector system may use LCD technology, DLP (digital light processor) technology, or other technologies.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A light source device comprising:
   a first solid state light source for generating a first color light;

a second solid state light source for generating a second color light;

a light combining device for receiving the first and second color lights and combining them into a combined light beam;

a color filter device disposed to receive a light spot generated by the combined light beam, including a first filter segment transmitting at least a portion of the first color light and a second filter segment transmitting at least a portion of the second color light, wherein portions of the first and second filter segments define one or more spoke ranges located near one or more boundaries between adjacent ones of the first and second filter segments, including a first spoke range located near a first boundary between the first and second filter segments;

a drive mechanism for driving the color filter device to move periodically, wherein the first and second filter segments and the first spoke range are alternately disposed on a path of the combined light beam to be illuminated by the light spot when the color filter device moves; and a light source control device for controlling the first and second light sources, wherein the light source control device turns on only the first light source when at least a portion of the light spot is located in the first filter segment outside of any spoke range, turns on only the second light source when at least a portion of the light spot is located in the second filter segment outside of any spoke range, and turns on both the first and the second light sources when the light spot is located entirely in the first spoke range.

2. The light source device of claim 1, wherein the light source control device further controls output powers of the first and second light source to adjust a ratio of output flux of the first and second lights.

3. The light source device of claim 1, further comprising a third solid state light source for generating a third color light, wherein the light combination device combines the first, second and third color lights into the combined light beam, wherein the color filter device further includes a third filter segment transmitting at least a portion of the third color light, wherein portions of the first through third filter segments define one or more spoke ranges located near one or more boundaries between adjacent ones of the first through third filter segments, wherein the first through third filter segments are alternately disposed on the path of the combined light beam to be illuminated by the light spot when the color filter device moves, and wherein the light source control device turns on only the third light source when at least a portion of the light spot is located in the third filter segment outside of any spoke range.

4. The light source device of claim 3, wherein the spoke ranges include a second spoke range located near a boundary between the second and third filter segments, and wherein the light source control device turns on both the second and the third light sources when the light spot is located entirely in the second spoke range.

5. The light source device of claim 3, wherein the color filter device further includes a fourth filter segment, wherein portions of the first through fourth filter segments define one or more spoke ranges located near one or more boundaries between adjacent ones of the first through fourth filter segments, wherein the first through fourth filter segments are alternately disposed on the path of the combined light beam to be illuminated by the light spot when the color filter device moves, and wherein the light source control device turns on at least two of the first through third light sources when at least a portion of the light spot is located in the fourth filter segment outside of any spoke range.

6. The light source device of claim 3, wherein the color filter device further includes a fourth, a fifth and a sixed filter segment, wherein portions of the first through sixth filter segments define one or more spoke ranges located near one or more boundaries between adjacent ones of the first through sixth filter segments, wherein the first through sixth filter segments are alternately disposed on the path of the combined light beam to be illuminated by the light spot when the color filter device moves, wherein the first filter segment transmits a first wavelength range in the first color light and reflects a rest of the first color light and other color lights, the fourth filter segment transmits a second wavelength range in the first color light and reflects a rest of the first color light and other color lights, the second filter segment transmits a third wavelength range in the second color light and reflects a rest of the second color light and other color lights, the fifth filter segment transmits a fourth wavelength range in the second color light and reflects a rest of the second color light and other color lights, the third filter segment transmits a fifth wavelength range in the third color light and reflects a rest of the third color light and other color lights, the sixth filter segment transmits a sixth wavelength range in the third color light and reflects a rest of the third color light and other color lights, and wherein the light source control device turns on only the first light source when at least a portion of the light spot is located in the fourth filter segment outside of any spoke range, turns on only the second light source when at least a portion of the light spot is located in the fifth filter segment outside of any spoke range, and turns on only the third light source when at least a portion of the light spot is located in the sixth filter segment outside of any spoke range.

7. The light source device of claim 6, wherein the first solid state light source includes a first light emitting element emitting light having the first wavelength range in the first color light and a second light emitting element emitting light having the second wavelength range in the first color light.

8. The light source device of claim 7, wherein the light source control device turns on only the first light emitting element when at least a portion of the light spot is located in the first filter segment outside of any spoke range, and turns on only the second light emitting element when at least a portion of the light spot is located in the fourth filter segment outside of any spoke range.

9. The light source device of claim 1, further comprising a sensor for sensing a position of the color filter device relative to the light spot to generate a sync signal, and transmitting the sync signal to the light source control device, wherein the light source control device receives the sync signal and controls the turning on and off of the first and second light sources based on the sync signal.

10. The light source device of claim 1, wherein the first or second solid state light source includes one or more of: a light emitting diode (LED) array, an LED chip, or a wavelength conversion device which includes a wavelength conversion material and a LED or laser diode (LD) excitation source.

11. The light source device of claim 1, further comprising: a light collecting device disposed between the light combining device and the color filter device for collecting the light beam from the light combining device and reducing its divergence angle.

12. A projector system comprising:
the light source device of claim 1; and
a light modulator for modulating light from the color filter device of the light source device to form an image.

13. A method for providing a light source comprising:
generating a first color light using a first solid state light source;
generating a second color light using a second solid state light source;
combining the first and second color lights into a combined light beam using a light combining device;
providing a color filter device disposed to receive a light spot generated by the combined light beam, the color filter including a first filter segment transmitting at least a portion of the first color light and a second filter segment transmitting at least a portion of the second color light, wherein portions of the first and second filter segments define one or more spoke ranges located near one or more boundaries between adjacent ones of the first and second filter segments, including a first spoke range located near a first boundary between the first and second filter segments;
moving the color filter device periodically, wherein the first and second filter segments and the first spoke range are alternately disposed on a path of the combined light beam to be illuminated by the light spot when the color filter device moves; and
controlling the first and second light sources using a light source control device, including: turning on only the first light source when at least a portion of the light spot is located in the first filter segment outside of any spoke range, turning on only the second light source when at least a portion of the light spot is located in the second filter segment outside of any spoke range, and turning on both the first and the second light sources when the light spot is located entirely in the first spoke range.

14. The method of claim 13, further comprising:
controlling output powers of the first and second light source by the light source control device, to adjust a ratio of output flux of the first and second light sources.

15. The method of claim 13, further comprising generating a third color light using a third solid state light source,
wherein the light combination device combines the first, second and third color lights into the combined light beam,
wherein the color filter device further includes a third filter segment transmitting at least a portion of the third color light, wherein the first, second and third filter segments are alternately disposed on the path of the combined light beam to be illuminated by the light spot when the color filter device moves, wherein portions of the first, second and third filter segments define one or more spoke ranges located near one or more boundaries between adjacent ones of the first, second and third filter segments, and
wherein the controlling step further includes turning on only the third light source when at least a portion of the light spot is located in the third filter segment outside of any spoke range.

16. The method of claim 15, wherein the spoke ranges include a second spoke range located near a boundary between the second and third filter segments, and wherein the controlling step further includes turning on both the second and the third light sources when the light spot is located entirely in the second spoke range.

17. The method of claim 15, wherein the color filter device further includes a fourth filter segment, wherein portions of the first through fourth filter segments define one or more spoke ranges located near one or more boundaries between adjacent ones of the first through fourth filter segments, wherein the first through fourth filter segments are alternately disposed on the path of the combined light beam to be illuminated by the light spot when the color filter device moves, and
wherein the controlling step further includes turning on at least two of the first through third light sources when at least a portion of the light spot is located in the fourth filter segment outside of any spoke range.

18. The method of claim 15, wherein the color filter device further includes a fourth, a fifth and a sixed filter segment, wherein the first through sixth filter segments are alternately disposed on the path of the combined light beam to be illuminated by the light spot when the color filter device moves,
wherein the first filter segment transmits a first wavelength range in the first color light and reflects a rest of the first color light and other color lights, the fourth filter segment transmits a second wavelength range in the first color light and reflects a rest of the first color light and other color lights, the second filter segment transmits a third wavelength range in the second color light and reflects a rest of the second color light and other color lights, the fifth filter segment transmits a fourth wavelength range in the second color light and reflects a rest of the second color light and other color lights, the third filter segment transmits a fifth wavelength range in the third color light and reflects a rest of the third color light and other color lights, the sixth filter segment transmits a sixth wavelength range in the third color light and reflects a rest of the third color light and other color lights,
wherein portions of the first through sixth filter segments define one or more spoke ranges located near one or more boundaries between adjacent ones of the first through sixth filter segments, and
wherein the controlling step further includes turning on only the first light source when at least a portion of the light spot is located in the fourth filter segment outside of any spoke range, turning on only the second light source when at least a portion of the light spot is located in the fifth filter segment outside of any spoke range, and turning on only the third light source when at least a portion of the light spot is located in the sixth filter segment outside of any spoke range.

19. The method of claim 18, wherein the first solid state light source includes a first light emitting element emitting light having the first wavelength range in the first color light and a second light emitting element emitting light having the second wavelength range in the first color light, and
wherein the controlling step includes turning on only the first light emitting element when at least a portion of the light spot is located in the first filter segment outside of any spoke range, and turning on only the second light emitting element when at least a portion of the light spot is located in the fourth filter segment outside of any spoke range.

20. The method of claim 1, further comprising sensing a position of the color filter device relative to the light spot to generate a sync signal; and transmitting the sync signal to the light source control device, wherein controlling step is performed by the light source control device based on the sync signal.

* * * * *